US011936281B2

(12) United States Patent
Takagi (10) Patent No.: US 11,936,281 B2
(45) Date of Patent: Mar. 19, 2024

(54) GENERATOR COOLING STRUCTURE OF ENGINE

(71) Applicant: KAWASAKI JUKOGYO KABUSHIKI KAISHA, Hyogo (JP)

(72) Inventor: Jun Takagi, Himeji (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 128 days.

(21) Appl. No.: 17/183,849

(22) Filed: Feb. 24, 2021

(65) Prior Publication Data
US 2022/0271622 A1 Aug. 25, 2022

(51) Int. Cl.
*H02K 7/18* (2006.01)
*H02K 9/197* (2006.01)
*F02B 63/04* (2006.01)

(52) U.S. Cl.
CPC .......... *H02K 9/197* (2013.01); *H02K 7/1815* (2013.01); *F02B 63/042* (2013.01)

(58) Field of Classification Search
CPC ........ H02K 9/197; H02K 7/1815; H02K 9/19; F02B 63/042
See application file for complete search history.

(56) References Cited

U.S. PATENT DOCUMENTS

| 4,565,503 A * | 1/1986 | Wise .................. H02K 9/19 417/372 |
| 7,316,208 B2 | 1/2008 | Tanaka et al. |
| 8,381,698 B2 * | 2/2013 | Takano ................. F01M 11/02 123/196 R |
| 2013/0270938 A1* | 10/2013 | Matsuda ................ B60L 50/66 310/54 |
| 2014/0217842 A1* | 8/2014 | Kikuchi .................. H02K 9/19 310/54 |

FOREIGN PATENT DOCUMENTS

JP 2001258209 A * 9/2001

OTHER PUBLICATIONS

JP2001258209A English translation (Year: 2023).*

* cited by examiner

Primary Examiner — Christopher M Koehler
Assistant Examiner — Viswanathan Subramanian
(74) Attorney, Agent, or Firm — Wenderoth, Lind & Ponack, L.L.P.

(57) ABSTRACT

A generator cooling structure of an engine including a crankshaft and a generator arranged on one end side of the crankshaft includes a crankcase that houses the crankshaft and a generator cover that is coupled to the crankcase in order to house the generator. The generator has a rotor fixed to the crankshaft and a stator fixed in position with respect to the generator cover. A cooling medium supply passage, which is arranged in the direction of the one end side of the crankshaft in the stator in order to supply the cooling medium to the stator, is provided.

7 Claims, 8 Drawing Sheets

GENERATOR COOLING STRUCTURE OF ENGINE

BACKGROUND OF THE INVENTION

Field of the Invention

The present invention relates to a generator cooling structure of an engine.

Description of Related Art

A utility vehicle equipped with an engine includes an AC generator (ACG) driven by the engine, in which the power generated by the generator is supplied to a battery, electrical components, and the like provided in the utility vehicle. The generator is configured to be generally fixed to one end side of a crankshaft so as to generate power with the rotation of the crankshaft. However, since the stator of the generator heats up during the generation of power, the stator is cooled by oil.

For example, U.S. Pat. No. 7,316,208, which relates to an engine for motorcycles, discloses a cooling structure of an engine, in which: oil is ejected from below a crankcase toward a generator cover coupled to the crankcase; the ejected oil is supplied, on an air flow, to a stator by being guided upward along the inner surface of the generator cover; and thereby the stator is cooled.

In recent years, utility vehicles have been equipped with many electrical components such as power windows and air conditioners, and the amount of power required to operate the electrical components tends to increase. It is considered that a generator with a high power output is mounted to deal with such an increase in the amount of power. However, in this case, the amount of heat generated by the stator also generally increases, so that it is required to improve the cooling performance for the stator.

SUMMARY OF THE INVENTION

Therefore, an object of the present invention is to provide, in an engine in which a generator is arranged on one end side of a crankshaft, a generator cooling structure of the engine that can improve the cooling performance for a stator.

In order to achieve the above object, the present invention provides a generator cooling structure of an engine including a crankshaft and a generator arranged on one end side of the crankshaft, the generator cooling structure including: a crankcase that houses the crankshaft; and a generator cover that is coupled to the crankcase in order to house the generator, in which the generator has a rotor fixed to the crankshaft and a stator fixed in position relative to the generator cover, and a cooling medium supply passage, which is arranged in a direction of the one end side of the crankshaft in the stator in order to supply a cooling medium to the stator, is provided.

According to the present invention, in an engine in which a generator is arranged on one end side (a first side) of a crankshaft, a cooling medium supply passage is provided in the direction of the one end side of the crankshaft in a stator fixed in position relative to the generator cover. Thereby, a cooling medium can be directly supplied to the surface, on the one end (first) side of the crankshaft, of the stator from the cooling medium supply passage, so that the cooling performance for the stator can be improved. Since the surface, on the one end (first) side of the crankshaft, of the stator can be used as a surface for cooling the stator, the stator can be cooled even if the surface, on the other end side (second side) of the crankshaft, of the stator cannot be used as a surface for cooling the stator, so that a degree of freedom in design can be improved.

In one aspect of the present invention, the generator cooling structure includes a plate member to be attached to a generator cover, in which the cooling medium supply passage is formed by covering a groove portion provided in one of the generator cover and the plate member with the other of the generator cover and the plate member, and a supply port that supplies the cooling medium to the stator is provided in the cooling medium supply passage.

According to the present aspect, the cooling medium supply passage is formed by covering the groove portion provided in one of the generator cover and the plate member with the other of the generator cover and the plate member. Thus, the cooling medium supply passage can be formed relatively easily by attaching the plate member to the generator cover so as to cover the groove portion integrally molded with one of the generator cover and the plate member.

In one aspect of the present invention, a cooling medium supply passage, which supplies the cooling medium to another end side of a crankshaft in a stator, is provided in the crankshaft.

According to the present aspect, a cooling medium supply passage, which supplies a cooling medium to both the one end (first) side and the other end (second) side of the crankshaft in the stator, is provided, so that the stator can be cooled by the cooling medium supplied from a plurality of directions. Thereby, the cooling performance for the stator can be improved.

The present invention also provides a generator cooling structure of an engine including a crankshaft and a generator arranged on one end side of the crankshaft, the generator cooling structure including a generator cover that houses the generator, in which a cooling medium supply passage that supplies a cooling medium to the generator is provided in the generator cover.

According to the present invention, in an engine in which a generator is arranged on one end side of a crankshaft, a cooling medium supply passage is provided in the generator cover, so that a cooling medium can be directly supplied to the surface, on the side of the generator cover, of the generator from the cooling medium supply passage. Thereby, the cooling performance for the stator can be improved more than when a cooling medium is indirectly introduced, on an air flow, into the surface, on the side of the generator cover, of the generator. Since the surface, on the side of the crankshaft, of the generator can be used as a surface for cooling the generator, the generator can be cooled even if, for example, a cooling medium cannot be introduced, for some reason, from the surface, on the side opposite to the generator cover, of the generator, which is considered to be relatively easy to introduce the cooling medium. Thereby, a degree of freedom in design can be improved.

DETAILED DESCRIPTION OF THE PREFERRED EMBODIMENT

Hereinafter, a utility vehicle including a generator cooling structure according to an embodiment of the present invention will be described with reference to the accompanying drawings.

Figure 1:
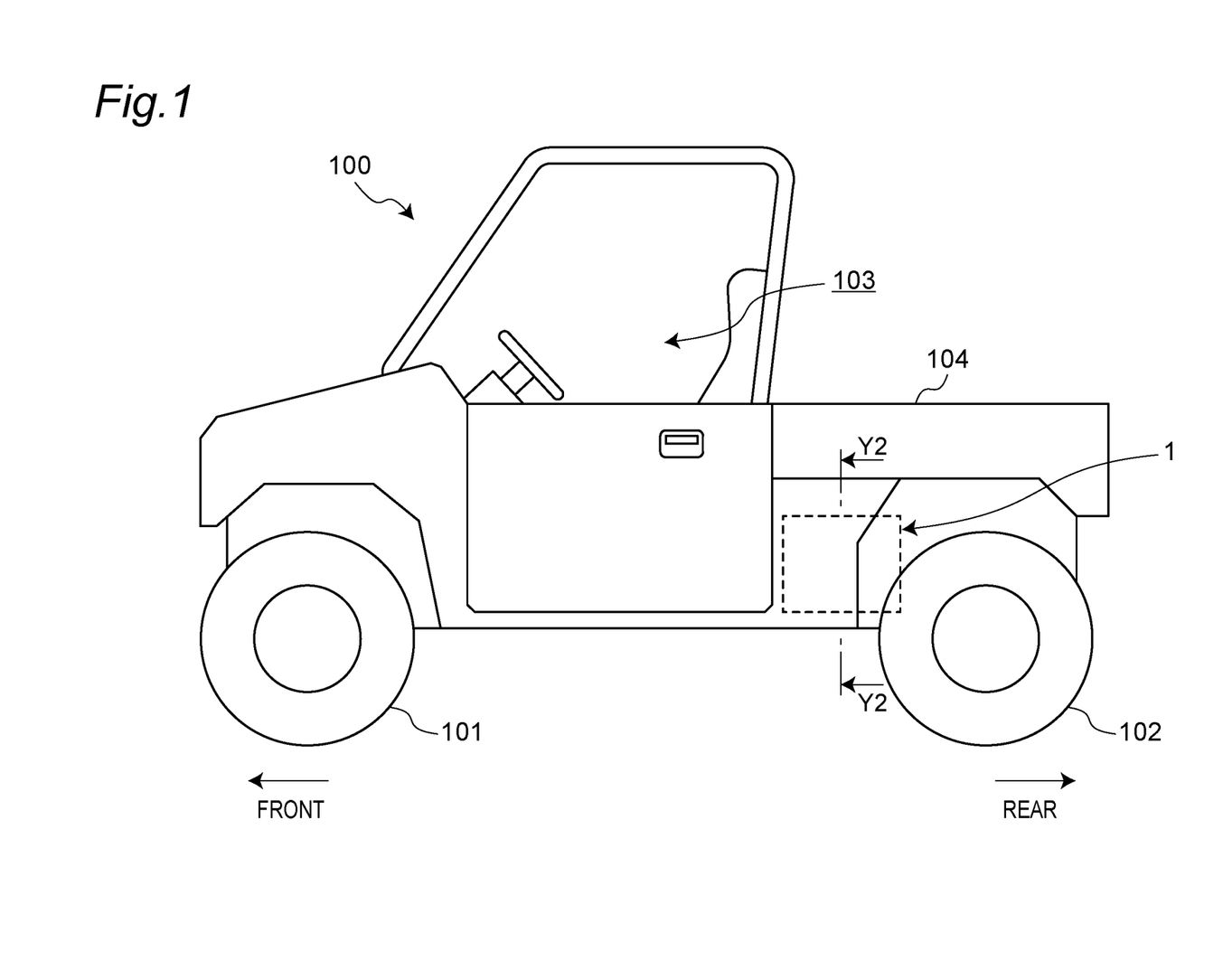
FIG. 1 is a schematic view of a utility vehicle including a generator cooling structure according to an embodiment of the present invention.

FIG. 1 is a schematic view of a utility vehicle including a generator cooling structure according to an embodiment of the present invention. A utility vehicle 100 shown in FIG. 1 is a vehicle that travels mainly not only on grasslands, gravel lands, and sandy lands, but also on off-roads such as unpaved mountain roads, forest roads, mud and rocky areas, etc. In the present specification, "front", "rear", "above", "below", "left", and "right" mean forward, backward, upward, downward, leftward, and rightward as seen by an occupant in the utility vehicle 100.

The utility vehicle 100 includes a pair of left and right front wheels 101 at the front of the vehicle body, a pair of left and right rear wheels 102 at the rear of the vehicle body, and a boarding space 103 for occupants to board between the front wheels 101 and the rear wheels 102. A load-carrying platform 104 is provided behind the boarding space 103, and an engine 1 is arranged below the load-carrying platform 104. The engine 1 is arranged at the rear of the vehicle body, and the driving force from the engine 1 is transmitted to the pairs of left and right front wheels 101 and rear wheels 102 via a transmission (not shown).

Figure 2:
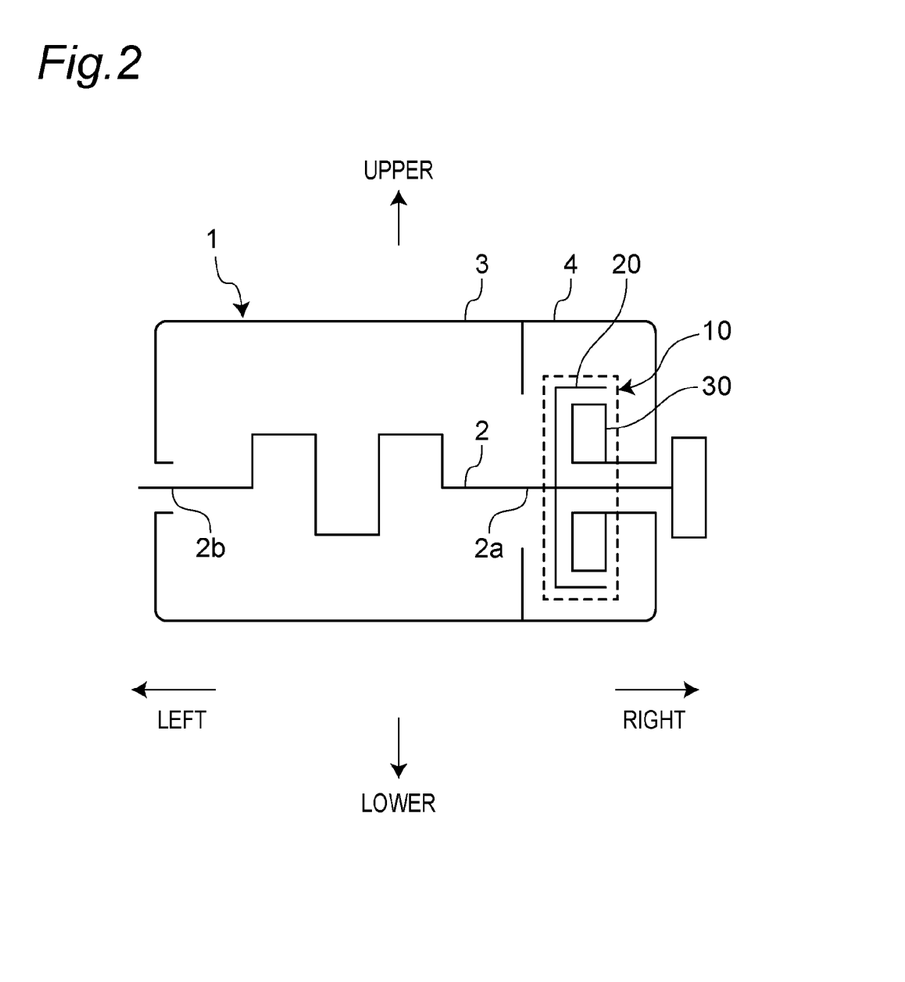
FIG. 2 is a schematic view of an engine taken along the Y2-Y2 line in FIG. 1.

FIG. 2 is a schematic view of the engine taken along the Y2-Y2 line in FIG. 1. As shown in FIG. 2, the engine 1 includes a crankshaft 2 extending in the left-right direction of the vehicle body and a generator (ACG) 10 arranged on the right side of the vehicle body that is one end side (first side) 2a of the crankshaft 2. The engine 1 includes a crankcase 3 that houses the crankshaft 2 and a generator cover 4 that houses a generator 10, in which the crankshaft 2 is rotatably supported by the crankcase 3. One end (the first end) of the crankshaft 2 is an end, in a direction in which the crankshaft extends, on one end side (first side) 2a in the direction of the axis of the crankshaft 2 with respect to the center of the crankshaft 2. The other end (the second end) of the crankshaft 2 is an end, in the direction in which the crankshaft extends, on the other end side (second side) 2b in the direction of the axis of the crankshaft 2 with respect to the center of the crankshaft 2.

Figure 3:
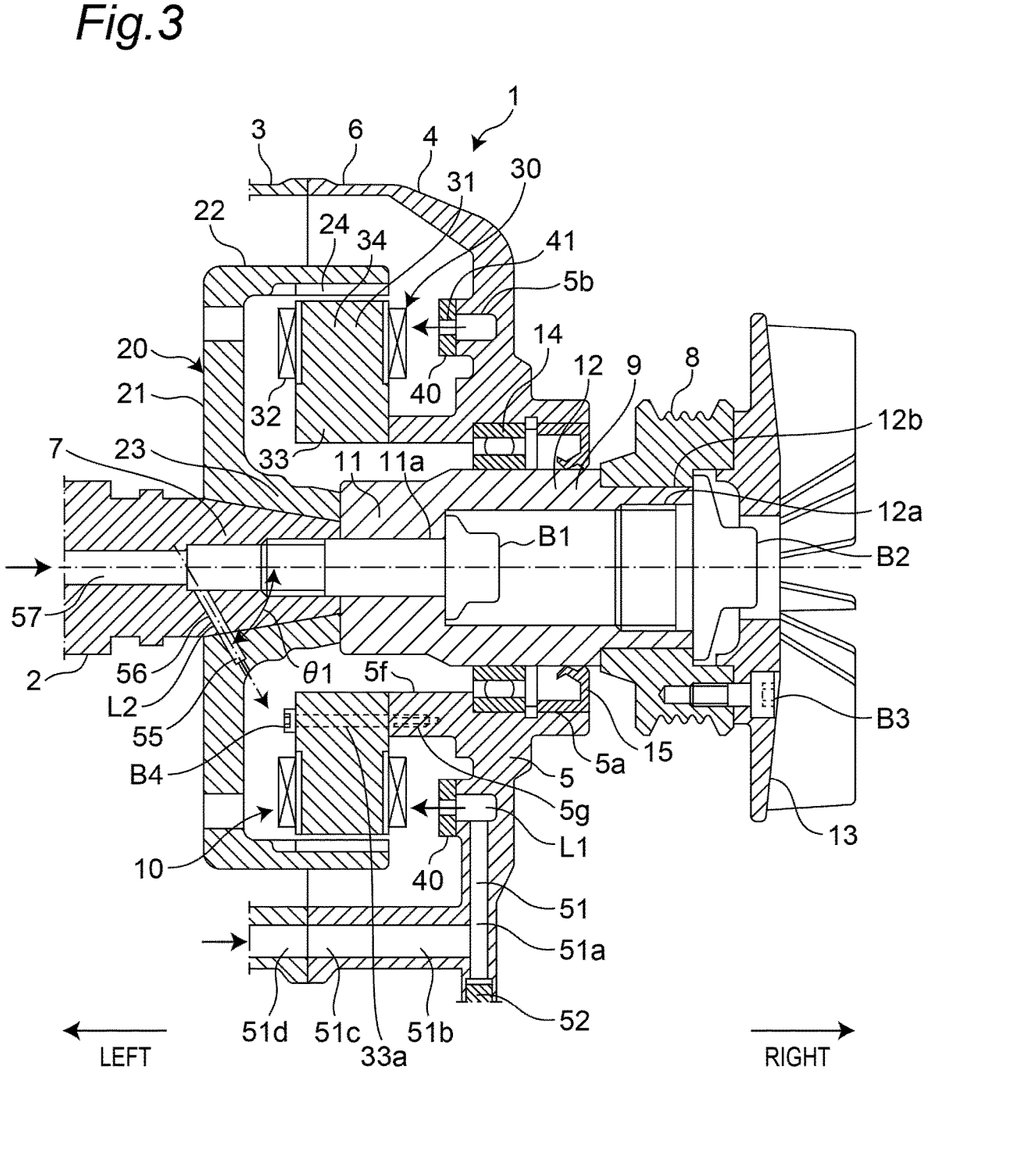
FIG. 3 is a cross-sectional view of an engine of a utility vehicle including a generator cooling structure according to a first embodiment of the present invention.

FIG. 3 is a cross-sectional view of the engine of a utility vehicle including a generator cooling structure according to a first embodiment of the present invention, showing the right side of the vehicle body of the engine 1. As shown in FIG. 3, the generator cover 4 includes: a vertical wall portion 5 that is arranged on the right side of the vehicle body of the crankcase 3 and extends in the radial direction orthogonal to the direction of the axis of the crankshaft 2; and a peripheral wall portion 6 that extends in a substantially cylindrical shape from the radial outside of the vertical wall portion 5 to the left side of the vehicle body that is the other end side of the crankshaft 2. The generator cover 4 is fastened to the crankcase 3 using fastening bolts (not shown) by matching the end surface on the left side of the vehicle body with the end surface, on the right side of the vehicle body, of the crankcase 3. Thereby, it is coupled to the crankcase 3. The generator cover 4 and the crankcase 3 are formed by casting using a material such as an aluminum alloy.

The generator 10 is fixed to the first side 2a in the direction of the axis of the crankshaft 2, that is, to the right side of the vehicle body in the present embodiment, and has: a rotor 20 formed in a bottomed cylindrical shape that opens to the right side of the vehicle body; and a stator 30 that is arranged in the cylindrical shape of the rotor 20 so as to face the rotor 20 in the left-right direction of the vehicle body, and is fixed in position relative to the generator cover 4.

The rotor 20 includes: a bottom surface portion 21 extending in the radial direction orthogonal to the direction of the axis of the crankshaft 2; a cylindrical portion 22 that extends in the direction of the axis of the crankshaft 2 from the radial outside of the bottom surface portion 21 to the right side of the vehicle body and is formed in a substantially cylindrical shape; and a boss portion 23 that protrudes in the direction of the axis of the crankshaft 2 from the radial inside of the bottom surface portion 21 to the right side of the vehicle body and is formed in a substantially cylindrical shape.

The inner peripheral surface of the boss portion 23 is formed by a tapered surface that is inclined, at a predetermined angle, in a more tapered shape as it goes closer to the right side of the vehicle body. The outer peripheral surface of a tip portion 7, on the right side of the vehicle body, of the crankshaft 2 is formed by a tapered surface that is inclined, at a predetermined angle, in a more tapered shape as it goes closer to the right side of the vehicle body. The tapered surface of the boss portion 23 is formed to be inclined at the same angle corresponding to the tapered surface of the tip portion 7 of the crankshaft 2.

A connecting member 9 for connecting the crankshaft 2 to a pulley 8 of an air conditioner compressor (not shown) is fixed to the end surface, on the right side of the vehicle body, of the crankshaft 2 by using a fastening bolt B1. The rotor 20 is fixed to the crankshaft 2 by fixing the connecting member 9 to the crankshaft 2 using the fastening bolt B1. The rotor 20 is configured to be positioned at a predetermined position in the circumferential direction of the crankshaft 2 by using a positioning pin (not shown).

The connecting member 9 is formed in a bottomed cylindrical shape. The connecting member 9 includes a bottom surface portion 11 extending in the radial direction orthogonal to the direction of the axis of the crankshaft 2, and a cylindrical portion 12 that has a substantially cylindrical shape and extends in the direction of the axis of the crankshaft 2 from the radial outside of the bottom surface portion 11 to the right side of the vehicle body. A bolt insertion hole 11a through which the fastening bolt B1 is to be inserted is formed in the bottom surface portion 11 of the connecting member 9. A screw hole 12a is formed in the inner peripheral surface, on the right side of the vehicle body, of the cylindrical portion 12 of the connecting member 9, and a pulley mounting portion 12b, into which the pulley 8 is to be fitted and attached, is formed in the outer peripheral surface on the right side of the vehicle body.

The pulley 8 is fixedly attached to the connecting member 9 fixed to the crankshaft 2 by fitting the pulley 8 to the pulley mounting portion 12b and screwing a fastening bolt B2 into the screw hole 12a. A cooling fan 13 is attached to the pulley 8 by using fastening bolts B3. The air conditioner compressor is driven by transmitting the rotational force of the crankshaft 2 to the pulley 8 via the connecting member 9.

The connecting member 9 extends to the right side of the vehicle body of the generator cover 4 through a connecting member insertion portion 5a provided in the center of the vertical wall portion 5 of the generator cover 4, and is rotatably supported by the connecting member insertion portion 5a via a bearing 14. The space between the connecting member 9 and the generator cover 4 is sealed by a sealing member 15 arranged on the right side of the vehicle body of the bearing 14.

The rotor 20 fixed to the one end side, in the direction of the axis, of the crankshaft 2 is configured to be rotated integrally with the crankshaft 2 together with the connecting member 9, the pulley 8, and the cooling fan 13. Permanent magnets 24 are fixedly attached to the inner peripheral surface of the cylindrical portion 22 of the rotor 20. The permanent magnets 24 are arranged such that the north and south poles alternate in the circumferential direction.

The stator 30 arranged to face the cylindrical portion 22 of the rotor 20 includes a stator core 31 having a plurality of teeth portions 34 extending radially at intervals in the circumferential direction, and coils 32 wound around the teeth portions 34 of the stator core 31. The stator core 31 are formed by laminating steel plates and has an annular portion 33 formed in a circular ring shape and the plurality of the teeth portions 34 extending radially outward in a radial shape from the annular portion 33. The coils 32 are wound around the teeth portions 34, respectively (see FIG. 6). The stator core 31 has 12 teeth portions 34 in the present embodiment. The stator 30 is fixed to the generator cover 4 by attaching the annular portion 33 to the generator cover 4 using fastening bolts B4.

Figure 6:
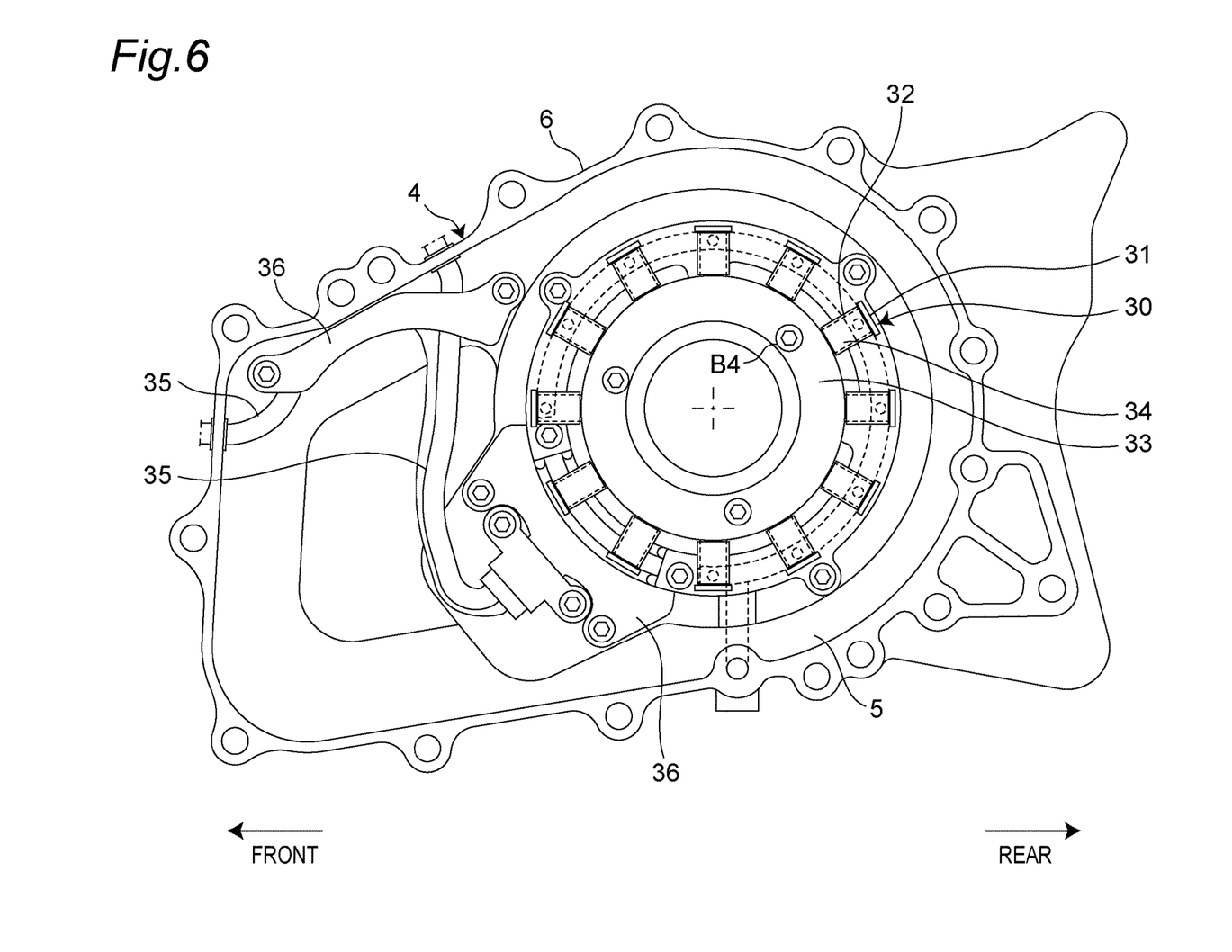
FIG. 6 is a front view of a generator cover including a plate member and a stator.

The generator 10 is configured such that: the rotor 20 fixed to the crankshaft 2 rotates with the rotation of the crankshaft 2 to generate power in the coils 32 of the stator 30; and the generated power can be taken out by using a cable 35 (see FIG. 6).

In the engine 1, in order to suppress heat generation during power generation in the generator 10, a first cooling medium supply passage L1 that supplies a cooling medium to the stator 30 is provided on the right side of the vehicle body that is toward the one end side (first side) 2a of the crankshaft 2 in the stator 30. In the present embodiment, engine oil, which is a lubricating and cooling medium for the engine 1 stored in the oil pan of the engine 1, is used as the cooling medium.

The cooling medium supply passage LL which is provided at the right side of the vehicle body along the crankshaft 2, is formed by: a groove portion 5b formed, in the vertical wall portion 5 of the generator cover 4, by being recessed from the left side of the vehicle body to the right side of the vehicle body; and a plate member 40 extending in the circumferential direction of the crankshaft 2 so as to cover the groove portion 5b.

Figure 4:
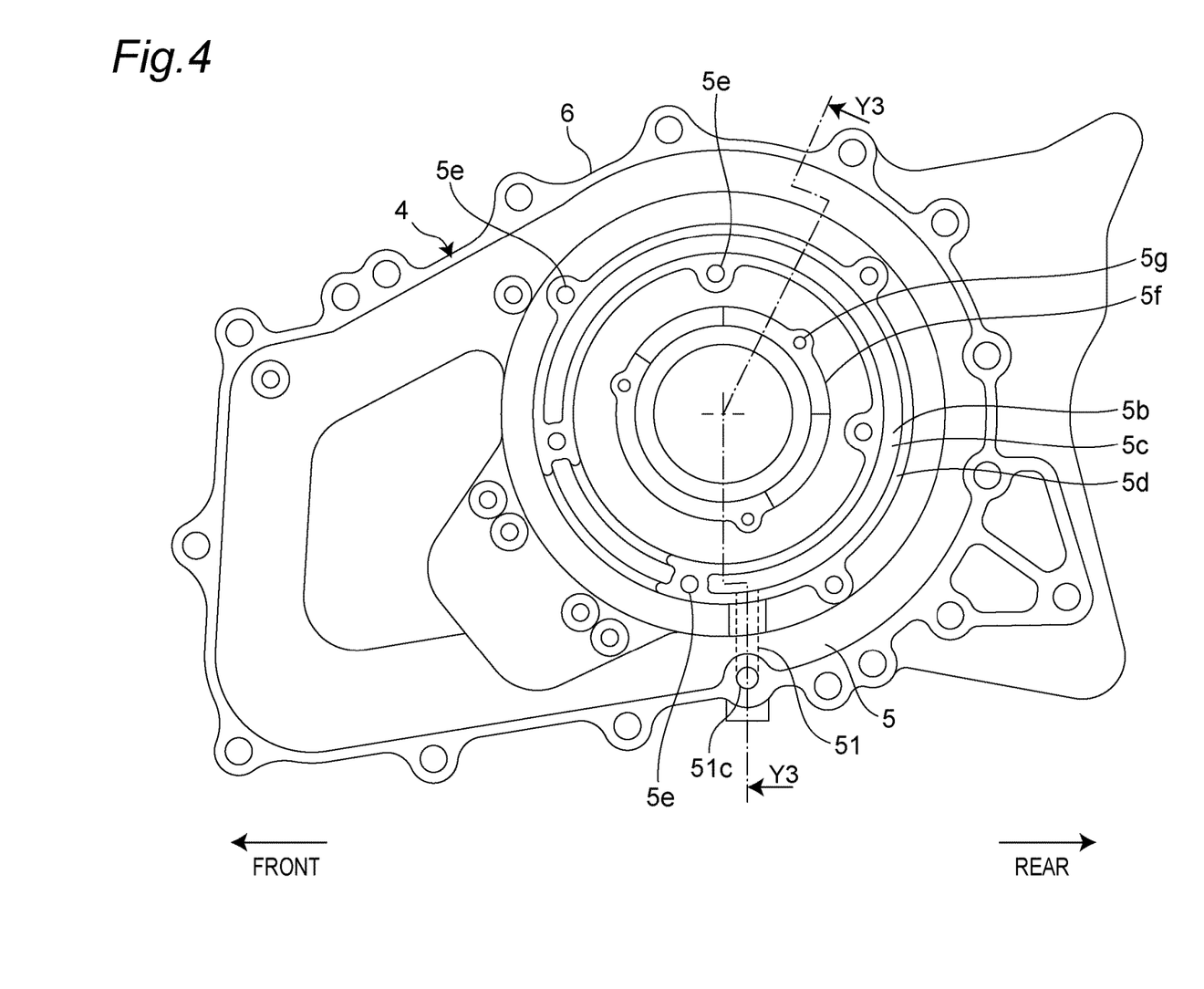
FIG. 4 is a front view of a generator cover.

FIG. 4 is a front view of the generator cover. FIG. 3 shows a cross-sectional view of the engine corresponding to the Y3-Y3 line in FIG. 4. As shown in FIG. 4, the groove portion 5b extending in the circumferential direction around the rotational axis of the crankshaft 2 is formed in the vertical wall portion 5 of the generator cover 4. The groove portion 5b is formed such that its cross section has a substantially rectangular shape by including a bottom wall portion 5c and a peripheral wall portion 5d extending from the bottom wall portion 5c to the left side of the vehicle body. The groove portion 5b is formed in a C shape, when viewed from the direction of the rotational axis of the crankshaft 2, by ranging over three-quarters of the circumferential direction from the lower side of the generator cover 4 to the rear side, upper side, and front side of the vehicle body. However, the cross section of the groove portion 5b is not limited to a rectangular shape, and may be formed in a substantially U shape formed by, for example, a curved bottom wall portion and a peripheral wall portion extending from both ends thereof to the left side of the vehicle body.

Figure 5:
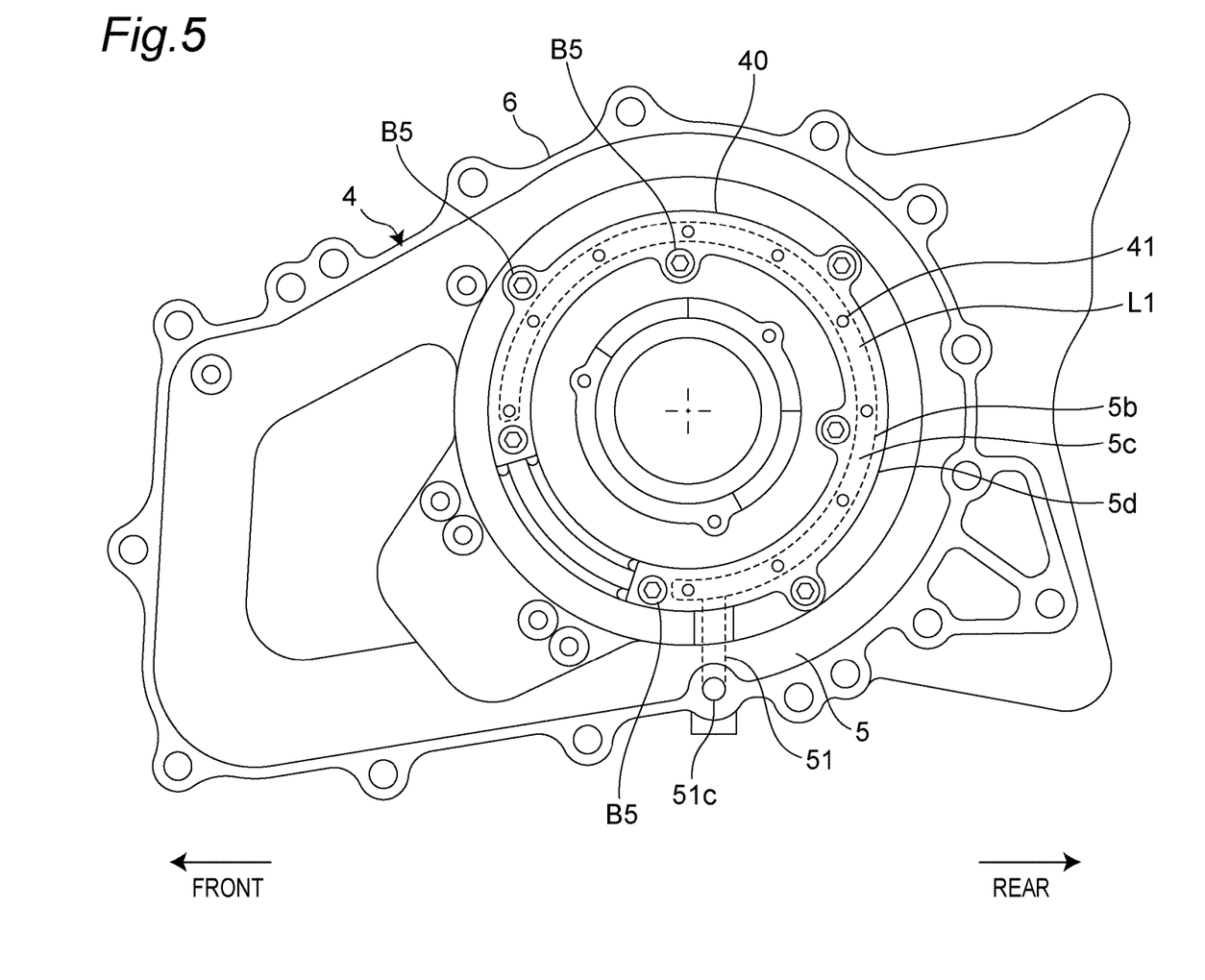
FIG. 5 is a front view of a generator cover including a plate member.

FIG. 5 is a front view of the generator cover including the plate member 40. As shown in FIG. 5, the plate member 40 having a flat plate shape is attached to the vertical wall portion 5 of the generator cover 4 so as to cover the groove portion 5b. The plate member 40 is formed to extend in the radial direction orthogonal to the direction of the axis of the crankshaft 2 and extend in the circumferential direction around the rotational axis of the crankshaft 2 along the groove portion 5b. The plate member 40 is formed in a C shape, when viewed from the direction of the rotational axis of the crankshaft 2, by ranging over three quarters of the circumferential direction from the lower side of the generator cover 4 to the rear side, upper side, and front side of the vehicle body. The plate member 40 is formed by machining using a plate-shaped member such as a steel plate.

The plate member 40 is fixedly attached to the generator cover 4 by screwing fastening bolts B5 into screw holes 5e provided in the peripheral wall portion 5d forming the groove portion 5b of the generator cover 4 through bolt insertion holes formed at both ends in the circumferential direction, the radial outer side, and the radial inner side. The cooling medium supply passage L1 is formed to extend in the circumferential direction of the crankshaft 2 by the groove portion 5b of the generator cover 4 and the plate member 40 covering the groove portion 5b.

A supply port 41 that supplies oil as the cooling medium to the stator 30 is formed in the plate member 40. The supply port 41 of the plate member 40 extends parallel to the direction of the axis of the crankshaft 2, and a plurality of supply ports 41, 10 supply ports 41 in the present embodiment, are provided in the circumferential direction of the crankshaft 2. In the present embodiment, the supply ports 41 of the plate member 40 are opened in a circular shape, and they are provided at the positions facing the stator core 31 of the stator 30, specifically, the teeth portions 34 and the coils 32 wound around the teeth portions 34 (see FIG. 6). In this way, the supply ports 41 that supply the cooling medium to the stator 30 are provided in the cooling medium supply passage L1, and the supply ports 41 are arranged at intervals in the circumferential direction.

The cooling medium supply passage L1 extending in the circumferential direction of the crankshaft 2 is formed to have a size in which the radius of the cooling medium supply passage L1 corresponds to the distance from the center of the rotational axis of the crankshaft 2 to the teeth portion 34 of the stator core 31. The supply ports 41 are configured to be arranged at positions facing, in the direction of the axis of the crankshaft 2, the teeth portions 34 of the stator core 31.

The supply ports 41 provided in the cooling medium supply passage L1 are provided on both sides, with respect to the vertical plane passing through the rotational axis of the crankshaft 2 when viewed from at least the direction of the axis of the crankshaft 2, of the generator 10 attached to the crankshaft 2, the direction of the axis of which is horizontally arranged, specifically, provided on the front side of the vehicle body and the rear side of the vehicle body.

The supply ports 41 provided in the cooling medium supply passage L1 are also provided in the generator 10 attached to the crankshaft 2, the direction of the axis of which is horizontally arranged, in order to eject and supply the cooling medium to the stator 30 arranged at least vertically above the rotational axis of the crankshaft 2. Thereby, a cooling effect can be more improved than when the supply ports 41 supply the cooling medium only to the stator 30 arranged vertically below the rotational axis of the crankshaft 2, because the cooling medium supplied to the stator 30 arranged above the rotational axis of the crankshaft 2 also contacts and cools the stator 30 arranged below the rotational axis of the crankshaft 2 when it falls down due to gravity, in addition to the cooling of the stator 30 arranged vertically above the rotational axis of the crankshaft 2.

FIG. 6 is a front view of a generator cover 4 including the plate member and the stator. As shown in FIG. 6, the stator 30 is fixedly attached to the generator cover 4 by screwing the fastening bolts B4 into the screw holes 5g of a mounting boss portion 5f provided on the radial center side of the generator cover 4 through bolt insertion holes 33a provided in the annular portion 33 of the stator core 31.

The stator 30 is attached to the generator cover 4 such that the plurality of the supply ports 41 are arranged to face, in the direction of the axis, the teeth portions 34 of the stator core 31 and the coils 32 wound around the teeth portions 34, respectively. Two cables 35 connected to the stator 30 are attached to the generator cover 4 using mounting brackets 36. The cables 35 extend outward from the generator cover 4 so as to be connected to a rectifier (not shown), so that the power generated by the generator 10 can be converted from alternating current into direct current and supplied to a battery, electrical components, and the like.

The cooling medium supply passage L1 is formed in the generator cover 4 by the groove portion 5b and the plate member 40 so as to extend in the circumferential direction of the crankshaft 2. As shown in FIG. 3, an introductory passage 51 that introduces oil as the cooling medium is provided in the cooling medium supply passage L1. The introductory passage 51 includes: a radial passage 51a that is formed in the generator cover 4 so as to extend radially outward and downward from the lower side of the groove portion 5b; and an axial passage 51b that extends to the left side of the vehicle body from the lower side of the radial passage 51a, in the direction parallel to the axis of the crankshaft 2.

The radial passage 51a of the introductory passage 51 is connected to the cooling medium supply passage L1 in the vertical wall portion 5 of the generator cover 4 and formed to extend radially outward from the groove portion 5b. The radial outer end is blocked by a blocking member 52. The axial passage 51b of the introductory passage 51 is connected to the radial passage 51a in the peripheral wall portion 6 of the generator cover 4 and extends to the left side of the vehicle body, in the direction of the axis of the crankshaft 2. It opens to a coupling surface that is the end surface, on the left side of the vehicle body, of the generator cover 4. The left side of the vehicle body of the axial passage 51b of the introductory passage 51 constitutes an introductory port 51c that introduces the cooling medium into the cooling medium supply passage L1.

A crankcase-side supply port 51d, which supplies the cooling medium to the introductory port 51c, is provided in a coupling surface, which is an end surface on the right side of the vehicle body, of the crankcase 3. It is configured such that the oil stored in an oil pan arranged below the crankcase 3 is sucked up by an oil pump and supplied to the crankcase-side supply port 51d.

The oil supplied to the crankcase-side supply port 51d is introduced into the axial passage 51b of the introductory passage 51 from the introductory port 51c that opens to the coupling surface with the crankcase 3 in the generator cover 4. It is introduced into the cooling medium supply passage L1 through the radial passage 51a of the introductory passage 51, and is supplied to the stator core 31 and the coil 32 of the stator 30 from the cooling medium supply passage L1 through the supply port 41.

In this way, the first cooling medium supply passage L1 that supplies the cooling medium to the stator 30 is arranged toward the first side 2a of the crankshaft 2 in the stator 30. The cooling medium supply passage L1 is formed by covering the groove portion 5b provided in the generator cover 4 with the plate member 40.

In the engine 1, a second cooling medium supply passage L2, which supplies the cooling medium in the direction of the left side of the vehicle body at the second side of the crankshaft 2 in the stator 30, is also provided in the crankshaft 2. The second cooling medium supply passage L2 is formed by a radial passage 56 that extends radially so as to be inclined at a predetermined angle θ1 with respect to the rotational axis of the crankshaft 2. The radial passage 56 is arranged on the left side of the vehicle body of the stator 30, and is formed to be inclined radially outward at the predetermined angle θ1 as it goes closer to the right (first) side of the vehicle body. In the present embodiment, the predetermined angle θ1 is set to 25 degrees to 45 degrees.

A supply port 55 that supplies oil as the cooling medium to the stator 30 is formed in the cooling medium supply passage L2. The supply port 55 is provided in the rotor 20 and is formed to be inclined in the radial direction at the predetermined angle θ1 with respect to the rotational axis of the crankshaft 2. The supply port 55 is connected to the radial passage 56 and is provided to extend in the same straight line as the radial passage 56. The cooling medium supply passage L2 is formed to supply the cooling medium to the stator core 31 and the coil 32 of the stator 30 from the supply port 55.

An introductory passage 57 that introduces oil as the cooling medium is provided in the cooling medium supply passage L2. The introductory passage 57 is formed in the crankshaft 2 so as to extend from the left side of the vehicle body to the right side of the vehicle body, and the end on the right side of the vehicle body is blocked by the fastening bolt B1.

It is configured such that the oil stored in an oil pan arranged below the crankcase 3 is sucked up by an oil pump and supplied to the introductory passage 57. It is configured such that the oil supplied to the introductory passage 57 is introduced into the cooling medium supply passage L2, and is supplied to the stator core 31 and the coil 32 of the stator 30 from the cooling medium supply passage L2 through the supply port 55.

The engine 1 is configured such that the cooling medium is supplied to the first side 2a of the crankshaft 2 in the stator 30 from the first cooling medium supply passage L1, and the cooling medium is supplied to the second side of the crankshaft 2 in the stator 30 from the second cooling medium supply passage L2.

The engine 1 is configured such that the cooling medium is supplied from both sides, in the direction of the axis of the crankshaft 2 in the stator 30 by the first cooling medium supply passage L1 and the second cooling medium supply passage L2. However, the cooling medium can also be supplied to the stator 30 only by the cooling medium supply passage L1.

In the present embodiment, the cooling medium supply passage L1 is formed in a C shape, when viewed from the direction of the rotational axis of the crankshaft 2, in the vertical wall portion 5 of the generator cover 4 by extending in the circumferential direction around the rotational axis of the crankshaft 2. However, it may be formed in a circular ring shape when viewed from the direction of the rotational axis of the crankshaft 2.

In addition, the introductory passage 51 that introduces the cooling medium into the cooling medium supply passage L1 is configured as an internal pipe formed in the generator cover 4. However, at least a part of the introductory passage, which introduces the cooling medium into the cooling medium supply passage L1, may be formed as an external pipe formed in the outside of the generator cover 4.

The cooling medium supply passage L1 is formed by covering the groove portion 5b provided in the generator cover 4 with the plate member 40. However, the cooling medium supply passage can also be formed by providing a groove portion in the plate member 40 and covering the groove portion provided in the plate member 40 with the generator cover 4. Even in such a case, a supply port that supplies the cooling medium to the stator is provided in the cooling medium supply passage.

In the present embodiment, the stator 30 is directly and fixedly attached to the generator cover 4, but it may be fixedly attached to a mounting bracket attached to the generator cover 4, as long as it is fixed in position relative to the generator cover 4. Alternatively, it may be fixedly attached to a member different from the generator cover 4. In addition, the connecting member insertion portion 5a is provided in the vertical wall portion 5 of the generator cover 4, but a vertical wall portion of the generator cover 4 can be formed to cover the one end side of the crankshaft 2 without providing the connecting member insertion portion.

The engine 1 can also be applied to engines other than those of utility vehicles. The engine 1 is arranged such that the direction of the axis of the crankshaft 2 extends in the vehicle width direction, but if the positional relationship among the cooling medium supply passage L1, the crankshaft 2, and the generator 10 is the same, the engine 1 can be applied to any engines regardless of the overall attitudes of the engines. The engine 1 can also be applied to an engine in which the direction of the axis of the crankshaft 2 extends in the front-rear direction of the vehicle body. The engine 1 can also be applied to an engine in which the direction of the axis of the crankshaft 2 extends vertically in the vertical direction and the rotor 20 rotates in the horizontal direction.

In the engine 1, the one end side in the direction of the axis of the crankshaft 2 is set on the right side of the vehicle body, but it may be configured such that the one end side in the direction of the axis of the crankshaft 2 is set on the left side of the vehicle body and the generator 10 is arranged on the left side of the vehicle body of the crankshaft 2. When the engine 1 is applied to an engine in which the direction of the axis of the crankshaft 2 extends in the front-rear direction of the vehicle body, the generator 10 may be arranged on one side, in the front-rear direction of the vehicle body, of the crankshaft 2.

The cooling medium supply passage L1 is not limited to a C-shape or a circular shape. The cooling medium supply passage L1 may have a shape other than a C-shape or a circular shape as long as the supply port 41 provided in the cooling medium supply passage L1 and the stator core 31 are in a face-to-face positional relationship in the left-right direction of the vehicle body.

As described above, the cooling structure of the engine 1 according to the present embodiment includes a crankshaft 2 and a generator 10 arranged on one end side of the crankshaft 2, and includes a crankcase 3 that houses the crankshaft 2 and a generator cover 4 that is coupled to the crankcase 3 in order to house the generator 10. The generator 10 has a rotor 20 fixed to the crankshaft 2 and a stator 30 fixed in position with respect to the generator cover 4. A cooling medium supply passage L1, which is arranged in the direction of the one end side of the crankshaft 2 in the stator 30 in order to supply the cooling medium to the stator 30, is provided.

Thereby, in an engine 1 in which the generator 10 is arranged on the one end side of the crankshaft 2, the cooling medium supply passage L1 is provided in the direction of the one end side of the crankshaft in the stator 30 fixed in position relative to the generator cover 4, so that the cooling medium can be directly supplied to the surface, on the one end side of the crankshaft, of the stator 30 from the cooling medium supply passage L1. Thereby, the cooling performance for the stator 30 can be improved. Since the surface, on the one end side of the crankshaft, of the stator 30 can be used as a surface for cooling the stator 30, the stator 30 can be cooled even if the surface, on the other end side of the crankshaft, of the stator 30 cannot be used as a surface for cooling the stator 30. Thereby, a degree of freedom in design can be improved.

In addition, a plate member 40 to be attached to the generator cover 4 is included, and the cooling medium supply passage L1 is formed by covering a groove portion 5b provided in one of the generator cover 4 and the plate member 40 with the other of the generator cover 4 and the plate member 40. A supply port 41 that supplies the cooling medium to the stator 30 is provided in the cooling medium supply passage L1. Thereby, the cooling medium supply passage L1 is formed by covering the groove portion 5b provided in one of the generator cover 4 and the plate member 40 with the other of the generator cover 4 and the plate member 40, so that the cooling medium supply passage L1 can be formed relatively easily by attaching the plate member 40 to the generator cover 4 so as to cover the groove portion 5b integrally molded with one of the generator cover 4 and the plate member 40.

In addition, the supply port 41 is provided in the plate member 40. Thereby, the supply port 41 is provided in the plate member 40, and hence when the supply port 41 is formed by machining, the efficiency of the machining in manufacturing can be increased by providing the supply port 41 in the plate member 40 to be formed by machining. For example, when the generator cover 4 is formed by casting and the plate member 40 is formed from a plate-shaped member by machining, the efficiency of the machining can be improved.

In addition, the stator 30 has a stator core 31 having a plurality of teeth portions 34 extending radially at intervals in the circumferential direction and coils 32 wound around the teeth portions 34 of the stator core 31. A plurality of the supply ports 41 are provided in the plate member 40 so as to be separated from each other in the circumferential direction, and provided at positions facing the teeth portions 34 of the stator core 31. Thereby, the plurality of the supply ports 41 that supply the cooling medium to the stator 30 from the cooling medium supply passage L1 are provided at the positions facing the teeth portions 34 of the stator core 31, so that the cooling medium can be directly supplied to the stator core 31 that generates heat during the power generation of the generator 10. Thereby, the stator core 31 and the coil 32 can be efficiently cooled.

In addition, an introductory port 51c that introduces the cooling medium into the cooling medium supply passage L1 is provided in the generator cover 4. The introductory port 51c is open to a coupling surface with the crankcase 3 in the generator cover 4. A crankcase-side supply port 51d that supplies the cooling medium to the introductory port 51c is provided in the crankcase 3. Thereby, the introductory port 51c for the cooling medium supply passage L1 provided in the generator cover 4 is opened to the coupling surface with the crankcase 3 in the generator cover 4, and the crankcase-side supply port 51d for the introductory port 51c is provided in the crankcase 3. Thus, a path that supplies the cooling medium to the cooling medium supply passage L1 can be formed by the crankcase 3 and the generator cover 4, and there is no need to attach, for example, a separate hose, etc., in order to supply the cooling medium.

In addition, a cooling medium supply passage L2, which supplies the cooling medium to the other end side of the crankshaft 2 in the stator 30, is provided in the crankshaft 2. Thereby, the cooling medium supply passages L1 and L2 that supply the cooling medium to both of the one end side and the other end side of the crankshaft 2 in the stator 30 are provided, so that the stator 30 can cooled by the cooling media supplied from a plurality of directions. Thereby, the cooling performance for the stator 30 can be improved.

The cooling medium is oil. Thereby, the cooling medium is the oil that is a lubricating and cooling medium for the engine 1, so that there is no need to prepare a separate cooling medium.

Figure 7:
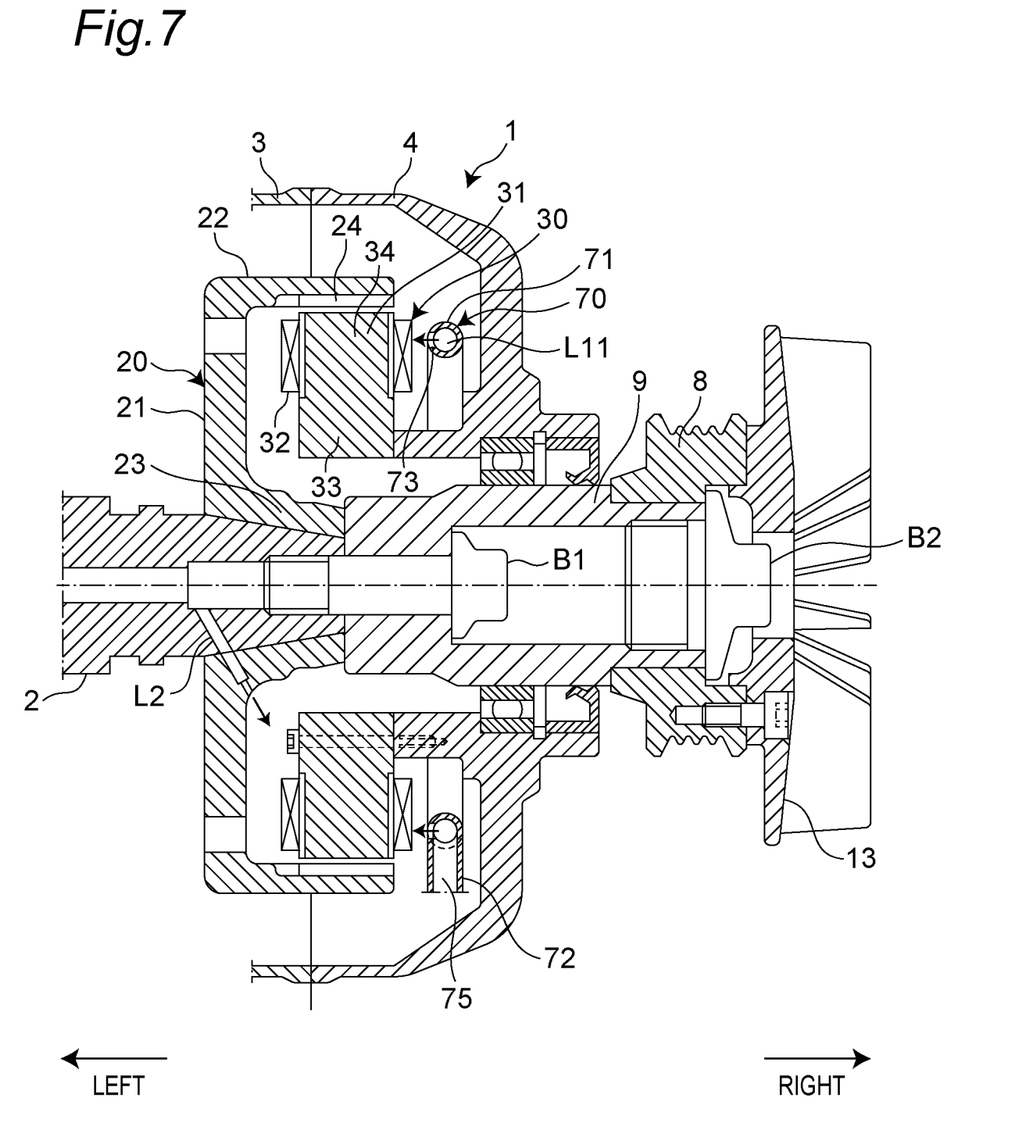
FIG. 7 is a cross-sectional view of an engine of a utility vehicle including a generator cooling structure according to a second embodiment of the present invention.
Figure 8:
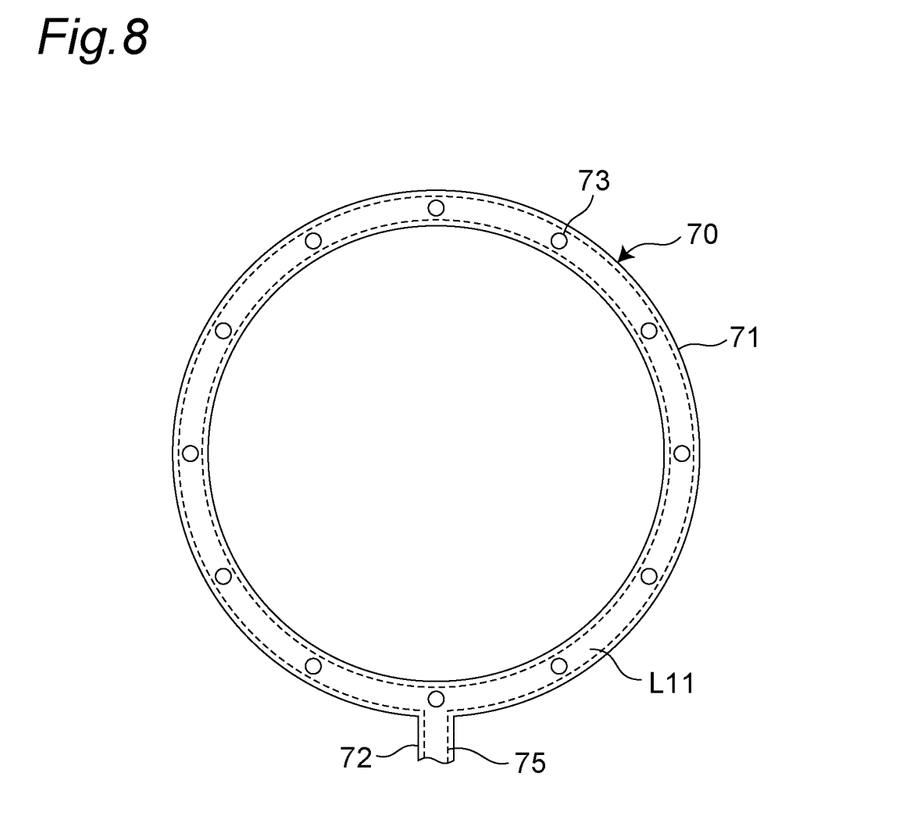
FIG. 8 is a front view showing a cooling medium supply member.

FIG. 7 is a cross-sectional view of an engine of a utility vehicle, including a generator cooling structure according to a second embodiment of the present invention, and FIG. 8 is a front view showing a cooling medium supply member. An engine 1 of a utility vehicle including the generator cooling structure according to the second embodiment is the same as that of the engine 1 of a utility vehicle according to the first embodiment, except that a cooling medium supply passage arranged on the right side of a vehicle body of a crankshaft 2 is different. Thus, the description of the same configurations will be omitted.

As shown in FIG. 7, also in the engine 1 of a utility vehicle according to the second embodiment, a generator 10 has a rotor 20 fixed to the crankshaft 2 and a stator 30 fixed in position relative to a generator cover 4. A cooling medium supply passage L11, which supplies, in the direction of the right side of the vehicle body of the crankshaft 2 in the stator 30, the cooling medium to the stator 30, is provided. Oil is used as the cooling medium.

In the present embodiment, the cooling medium supply passage L11 is formed by a cooling medium supply member 70 fixed to the generator cover 4. The cooling medium supply member 70 is arranged, in the direction of the axis of the crankshaft 2, between the stator 30 and the generator cover 4.

As shown in FIG. 8, the cooling medium supply member 70 includes an annular portion 71 formed in a circular ring shape, and a radially extending portion 72 extending, in a straight line, downward and radially outward from the annular portion 71. The annular portion 71 and the radially extending portion 72 are each formed in a pipe shape whose cross section has a circular shape. However, the cross-sectional shapes of the annular portion 71 and the radially extending portion 72 are not limited to a circular shape, and may be, for example, a rectangular shape. The cooling medium supply member 70 is fixedly attached to the generator cover 4 with a mounting bracket (not shown) such that the annular portion 71 is arranged in the radial direction orthogonal to the rotational axis of the crankshaft 2 with the center of the annular portion 71 matching the rotational axis of the crankshaft 2.

The cooling medium supply passage L11 is formed in the annular portion 71 of the cooling medium supply member 70. The cooling medium supply passage L11 is formed to extend in the circumferential direction of the crankshaft 2, and is formed in a circular ring shape when viewed from the direction of the rotational axis of the crankshaft 2.

A supply port 73 that supplies oil as the cooling medium to the stator 30 is formed in the annular portion 71 of the cooling medium supply member 70. The supply port 73 extends parallel to the direction of the axis of the crankshaft 2, and a plurality of the supply ports 73 are provided in the circumferential direction of the crankshaft 2. In the present embodiment, there are 12 supply ports 73 provided. The supply ports 73 are provided at positions facing teeth portions 34 of the stator core 31 and coils 32 wound around the teeth portion 34. In this way, the supply ports 73, which supply the cooling medium to the stator 30, are provided in the cooling medium supply passage L11, which are arranged at intervals in the circumferential direction.

An introductory passage 75 that introduces oil as the cooling medium is also provided in the cooling medium supply passage L11. The introductory passage 75 is formed in the radially extending portion 72 of the cooling medium supply member 70, and is formed to extend, downward, toward the radial outside of the crankshaft 2.

The introductory passage 75 is configured such that the oil stored in an oil pan arranged below the crankcase 3 is sucked up by an oil pump and supplied to the side opposite to the portion connected to the cooling medium supply passage L11. The oil supplied to the introductory passage 75 is introduced into the cooling medium supply passage L11, and is supplied to the stator core 31 and the coils 32 of the stator 30 from the cooling medium supply passage L11 through the supply port 73.

Also in the present embodiment, the cooling medium supply passage L11 that supplies the cooling medium to the stator 30 is fixedly arranged, in this way, in the direction of the one end side of the crankshaft 2 in the stator 30. The cooling medium supply passage L11 is formed by the cooling medium supply member 70.

The cooling medium supply member 70 is directly and fixedly attached to the generator cover 4, but if it is fixed in position relative to the generator cover 4, it may be fixedly attached to a mounting bracket attached to the generator cover 4. Alternatively, it may be fixedly attached to a member different from the generator cover 4.

The annular portion 71 of the cooling medium supply member 70 is not limited to a circular shape. The cooling medium supply passage L11 formed in the annular portion 71 of the cooling medium supply member 70 may have a shape other than a circular shape as long as the supply port 73 provided in the cooling medium supply passage L11 and the stator core 31 are in a face-to-face positional relationship in the left-right direction of the vehicle body.

As described above, the cooling medium supply passage L11, which is arranged in the direction of the one end side of the crankshaft 2 in the stator 30 in order to supply the cooling medium to the stator 30, is also provided in the cooling structure of the engine 1 according to the present embodiment.

Thereby, in the engine 1 in which the generator 10 is arranged on the one end side of the crankshaft 2, the cooling medium supply passage L11 is provided in the direction of the one end side of the crankshaft in the stator 30 fixed in position relative to the generator cover 4. Thus, the cooling medium can be directly supplied to the surface, on the one end side of the crankshaft, of the stator 30 from the cooling medium supply passage L11, and the cooling performance for the stator 30 can be improved.

In addition, the cooling medium supply passage L11 is formed by the cooling medium supply member 70. Thereby, the cooling medium supply passage L11 can be formed by fixing the cooling medium supply member 70 to the generator cover 4. Thereby, the cooling performance for the stator 30 can be improved relatively easily.

In the present embodiment, each of the cooling medium supply passages L1 and L11 is formed in a tunnel shape, and the portions other than an inlet and an outlet are formed by being covered with a peripheral wall. Thereby, it can be made easier to spray the cooling medium to the stator 30 from the cooling medium supply passages L1 and L11 by increasing the supply pressure of the cooling medium. The supply ports 41 and 73 provided in the cooling medium supply passages L1 and L11 can make it easier to inject the cooling medium to the stator 30, in which the supply ports 41 and 73 arranged on the upper side and the supply ports 41 and 73 arranged on the lower side inject substantially the same flow rate of the cooling medium at substantially the same supply pressure.

The plurality of the supply ports 41 and 73 provided in the cooling medium supply passages L1 and L11 are opened in the same circular shape, but they can also be formed such that the sizes and shapes thereof are different for each of the supply ports 41 and 73.

For example, the supply ports 41 and 73 arranged on the upper side in the vertical direction can also be made larger in size than the supply ports 41 and 73 arranged on the lower side in the vertical direction. In addition, if a high heat generation portion having a large heat generation amount and a low heat generation portion having a small heat generation amount exist in the stator core 31 for some reason, the cooling for the high heat generation portion can also be promoted by making the supply ports 41 and 73 facing the high heat generation portion larger in size than the supply ports 41 and 73 facing the low heat generation portion. For example, from the viewpoint of optimizing an injection jet that injects the cooling medium, the supply ports 41 and 73 may be formed in a shape other than a circular shape. Alternatively, they may be formed in a different shape for each of the supply ports 41 and 73.

In the present embodiment, the supply ports 41 and 73 are arranged parallel to the positions, facing in the direction of the axis of the crankshaft 2, of the teeth portions 34 of the stator core 31, so that the cooling medium is supplied to the side surface of the teeth portions 34. However, the supply ports 41 and 73 may be formed such that a part of the cooling medium is also supplied to the radial outer surface of the teeth portion 34, which is the upper surface of the teeth portion 34.

Although the supply ports 41 and 73 are formed parallel to the direction of the axis of the crankshaft 2, they may be formed to extend in a direction inclined with respect to the direction of the axis of the crankshaft 2. For example, the supply ports 41 and 73 may be formed in an inclined direction in which the cooling medium supplied to the stator core 31 flows along the circumferential direction of the stator 30, specifically, in an inclined direction going toward the one side in the circumferential direction and radial inside of the crankshaft 2.

In the present embodiment, a cooling structure for cooling the generator 10 provided in the engine 1 is described, but the cooling structure according to the present embodiment is not limited to the generator 10 and can be applied to a motor. It can also be applied to an integrated starter generator (ISG).

The present invention is not limited to the illustrated embodiments, and various improvements and design changes can be made without departing from the gist of the present invention.

What is claimed is:

1. A generator cooling structure of an engine including a crankshaft and a generator arranged on a first side of the crankshaft, the generator cooling structure comprising:
   a crankcase for housing the crankshaft;
   a generator cover coupled to the crankcase to house the generator;
   a first cooling medium supply passage located toward the first side of the crankshaft; and
   a second cooling medium supply passage located toward a second side of the crankshaft,
   wherein the generator has a rotor fixed to the crankshaft and a stator fixed in position relative to the generator cover,
   wherein the first cooling medium supply passage is arranged toward the first side of the crankshaft to supply a cooling medium to a first side of the stator,
   wherein the second cooling medium supply passage is located in the crankshaft, the second cooling medium supply passage including a supply port in the crankshaft for supplying the cooling medium to a second side of the generator, and
   wherein the supply port of the second cooling medium supply passage is inclined in a radial direction relative to an axis of rotation of the crankshaft.

2. The generator cooling structure of an engine according to claim 1, further comprising a plate member to be attached to the generator cover,
   wherein the first cooling medium supply passage is formed of a groove portion on a first one of the generator cover and the plate member covered by a second one of the generator cover and the plate member, and
   wherein the first cooling medium supply passage includes a supply port for supplying the cooling medium to the stator.

3. The generator cooling structure of an engine according to claim 2, wherein the supply port of the first cooling medium supply passage is provided in the plate member.

4. The generator cooling structure of an engine according to claim 3, wherein:
   the stator has a stator core having a plurality of teeth portions extending radially at intervals in a circumferential direction and coils wound around the teeth portions of the stator core,
   the supply port of the first cooling medium supply passage is one of a plurality of supply ports in the plate member, the plurality of supply ports being separated from each other in a circumferential direction, and
   the plurality of supply ports are provided at positions to face the teeth portions of the stator core.

5. The generator cooling structure of an engine according to claim 1, further comprising:

an introductory port for introducing the cooling medium into the first cooling medium supply passage, the introductory portion being provided in the generator cover, the introductory port being open to a coupling surface with the crankcase in the generator cover, and a crankcase-side supply port in the crankcase for supplying the cooling medium to the introductory port.

6. The generator cooling structure of an engine according to claim 1, wherein the cooling medium is oil.

7. The generator cooling structure of an engine according to claim 1, wherein the second cooling medium supply passage is inclined at an angle less than 90 degrees relative to the axis of rotation of the crankshaft.

\* \* \* \* \*